(12) United States Patent
Ragan

(10) Patent No.: US 9,428,338 B2
(45) Date of Patent: Aug. 30, 2016

(54) CONVEYOR HAVING ROLLERS ACTUATED BY ELECTROMAGNETIC INDUCTION

(71) Applicant: Laitram, L.L.C., Harahan, LA (US)

(72) Inventor: Bryant G. Ragan, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 14/384,802

(22) PCT Filed: Mar. 12, 2013

(86) PCT No.: PCT/US2013/030364
§ 371 (c)(1),
(2) Date: Sep. 12, 2014

(87) PCT Pub. No.: WO2013/169343
PCT Pub. Date: Nov. 14, 2013

(65) Prior Publication Data
US 2015/0034455 A1    Feb. 5, 2015

Related U.S. Application Data

(60) Provisional application No. 61/643,730, filed on May 7, 2012.

(51) Int. Cl.
| | |
|---|---|
| *B65G 17/24* | (2006.01) |
| *B65G 13/06* | (2006.01) |
| *B65G 54/02* | (2006.01) |
| *H02K 49/04* | (2006.01) |

(Continued)

(52) U.S. Cl.
CPC ............... *B65G 13/06* (2013.01); *B65G 17/24* (2013.01); *B65G 47/34* (2013.01); *B65G 54/02* (2013.01); *H02K 16/02* (2013.01); *H02K 17/16* (2013.01); *H02K 49/04* (2013.01)

(58) Field of Classification Search
CPC ............................. B65G 17/24; B65G 47/244
USPC ................... 198/617, 619, 779, 805
See application file for complete search history.

(56) References Cited

U.S. PATENT DOCUMENTS

| | | | | |
|---|---|---|---|---|
| 2,684,753 | A | * | 7/1954 | Kolbe .................. B65G 23/18 198/805 |
| 2,731,212 | A | | 1/1956 | Baker |
| 4,781,286 | A | | 11/1988 | Weaver |
| 5,899,320 | A | | 5/1999 | Miyasaka |

(Continued)

FOREIGN PATENT DOCUMENTS

| | | |
|---|---|---|
| EP | 0425021 B1 | 6/1993 |
| JP | 03155408 A | 7/1991 |

(Continued)

OTHER PUBLICATIONS

Hongsheng Zhao and Yunzhen Wu, "A New Roller Conveyor Driven by a Linear Motor," Advanced Materials Research, vols. 201-203, pp. 1517-1520, 2011.

*Primary Examiner* — Douglas Hess
(74) *Attorney, Agent, or Firm* — James T. Cronvich

(57) ABSTRACT

Conveyor rollers rotated by electromagnetic induction to propel articles conveyed atop the rollers. A magnetic-field source induces a current in the electrically conductive rollers that causes them to rotate. The rollers can be mounted in conveyor belts or immobile mats. The magnetic-field source can be static if the rollers are advance through the field or dynamic. Alternatively, the rollers can be magnetic and induce a current in a stationary electrically conductive plate that creates interacting magnetic fields to rotate the rollers.

26 Claims, 5 Drawing Sheets

(51) Int. Cl.
*H02K 16/02* (2006.01)
*H02K 17/16* (2006.01)
*B65G 47/34* (2006.01)

(56) References Cited

U.S. PATENT DOCUMENTS

| | | | |
|---|---|---|---|
| 5,918,728 A | 7/1999 | Syverson | |
| 6,938,750 B2 | 9/2005 | Miller et al. | |
| 7,533,766 B1 * | 5/2009 | Fourney | B65G 17/24 198/370.09 |
| 7,556,136 B2 * | 7/2009 | Marshall | B65G 47/71 198/370.09 |
| 8,123,021 B2 * | 2/2012 | DePaso | B65G 17/24 198/370.09 |
| 8,413,793 B2 | 4/2013 | Brutt | |
| 8,511,460 B2 * | 8/2013 | Ragan | B65G 17/24 198/449 |
| 8,622,202 B2 * | 1/2014 | Rau | B65G 17/24 198/779 |
| 8,720,668 B2 * | 5/2014 | Ragan | B65G 17/24 198/449 |
| 9,156,629 B2 * | 10/2015 | Costanzo | B65G 47/71 |
| 2010/0230245 A1 | 9/2010 | Ragan et al. | |
| 2010/0236895 A1 | 9/2010 | Brutt | |

FOREIGN PATENT DOCUMENTS

| | | |
|---|---|---|
| JP | 078331 U | 2/1995 |
| KR | 1020070115188 A | 12/2007 |

\* cited by examiner

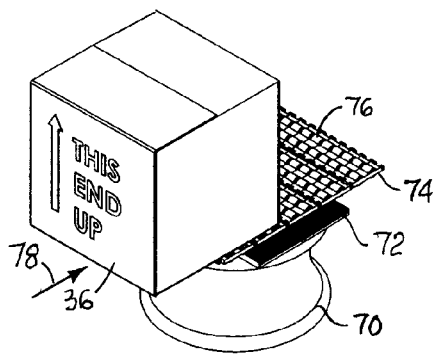
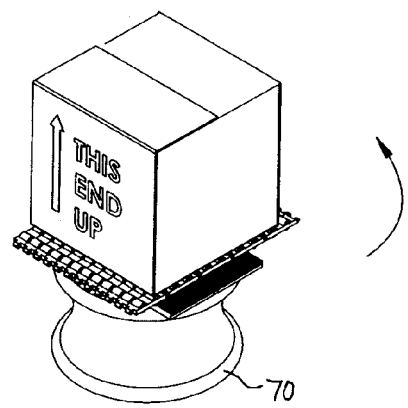
FIG. 7A          FIG. 7B
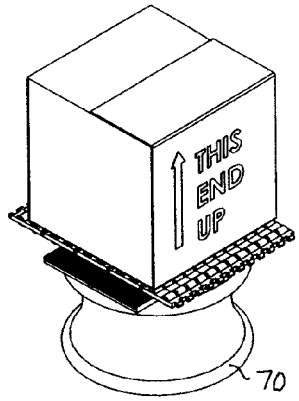
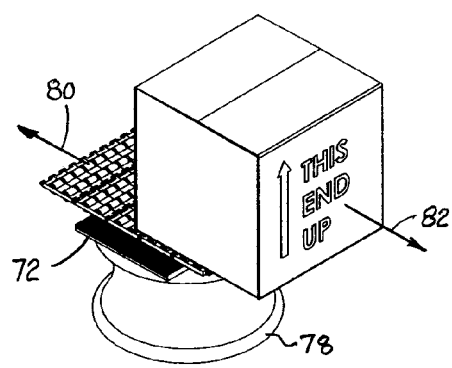
FIG. 7C          FIG. 7D
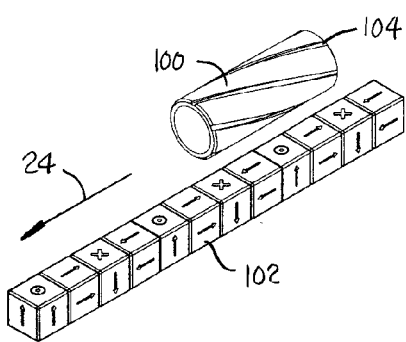
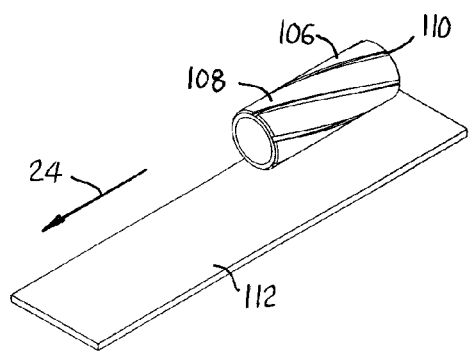
FIG. 9          FIG. 10

CONVEYOR HAVING ROLLERS ACTUATED BY ELECTROMAGNETIC INDUCTION

BACKGROUND

The invention relates generally to power-driven conveyors and more particularly to belt conveyors having electrically conductive rollers inductively actuated by interaction with a magnetic field.

Conveyor belts with article-supporting rollers are used to divert or orient articles as they are being conveyed. The belt rollers are rotated by contact with bearing surfaces or actuating rollers underlying the conveyor belt. As the belt advances, the belt rollers ride on the bearing surfaces or actuating rollers and are caused to rotate. The rotating belt rollers propel conveyed articles across or along the belt in the direction of the rollers' rotation. These belts are effective in sorting, orienting, registering, singulating, and otherwise diverting conveyed articles. But they do have some shortcomings. One shortcoming is noise. Contact between the belt rollers and the actuating rollers is noisy, especially at high belt speeds. Another shortcoming is roller wear. The frictional contact between the belt rollers and the bearing surfaces or actuating rollers wears away the belt rollers. And the need for frictional contact to rotate the belt rollers means that oil or other lubricants contaminating the conveyor cause the belt rollers to slip and alter the intended article trajectories. Furthermore, the rotational speed of the belt rollers and, consequently, the speeds of the articles depend on belt speed.

SUMMARY

These shortcomings are addressed by a conveyor embodying features of the invention. Such a conveyor comprises a conveyor belt having a plurality of electrically conductive rollers. A magnetic-field source generates a magnetic field that passes through the conveyor belt and induces a current in the electrically conductive rollers that causes the rollers to rotate.

Another version of such a conveyor comprises a magnetic circuit having a magnetic-field source forming a primary side of the magnetic circuit and an electrically conductive element forming a secondary side of the magnetic circuit. The magnetic-field source provides a primary magnetic field that induces a current in the electrically conductive element that creates a secondary magnetic field. A plurality of rollers forms a mat. Each of the rollers is either the magnetic-field source or the electrically conductive element; the other of the magnetic-field source and the electrically conductive element resides proximate the mat so that the primary and secondary magnetic fields coact to rotate the plurality of rollers.

In another aspect, a conveyor belt embodying features of the invention comprises a plurality of electrically conductive rollers that are adapted to interact with a magnetic field to induce a current in the rollers that causes them to rotate.

In yet another aspect of the invention, a method for conveying articles comprises: (a) supporting articles atop electrically conductive rollers in a conveyor belt; (b) subjecting the rollers to a magnetic field; (c) inducing a current in the electrically conductive rollers with the magnetic field to rotate the rollers; and (d) propelling articles along the conveyor belt with the rotating rollers.

BRIEF DESCRIPTION OF THE DRAWINGS

These aspects and features of the invention, as well as its advantages, are described in more detail in the following description, appended claims, and accompanying drawings, in which:

FIGS. 7A-7D are isometric views of a conveyor using fixed conductive rollers as in FIG. 1 atop a turntable to act as a conveyor sorter;

FIG. 9 is an isometric view as in FIG. 2 of an electrically conductive roller with helical grooves and actuated by a Hallbach array;

FIG. 10 is an isometric view of a magnetic roller coacting with a conductive plate.

DETAILED DESCRIPTION

Figure 1:
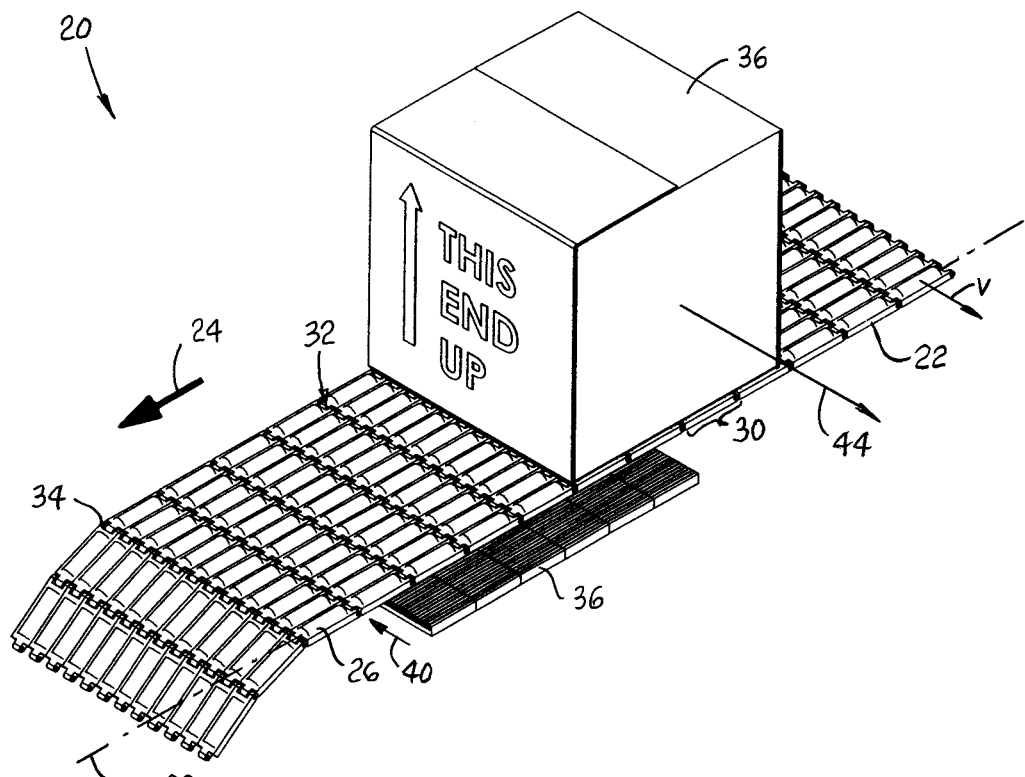
FIG. 1 is an isometric view of a portion of a conveyor embodying features of the invention, including conductive belt rollers rotated by electromagnetic induction.

A portion of a conveyor embodying features of the invention is shown in FIG. 1. The conveyor 20 comprises a conveyor belt 22 conventionally driven in a direction of belt travel 24. The belt includes a plurality of rollers 26 arranged to rotate freely on axes 28 in the direction of belt travel 24. The axes are defined by axles retained in the belt. In the example shown, the conveyor belt is a modular plastic conveyor belt constructed of a series of hingedly linked rows 30 of one or more belt modules having body sections extending from a first end to an opposite second in the direction of belt travel. The rollers 26 are mounted in cavities 32 in the belt with salient portions of the rollers protruding above an outer conveying surface 34 of the belt. Articles 36 are conveyed atop the belt rollers 26. Although the rollers are shown residing in cavities in the module bodies of a modular plastic belt, they could be mounted atop the belt or extend through a bottom surface of the belt or be carried in a flat belt or a ceramic belt.

Figure 2:
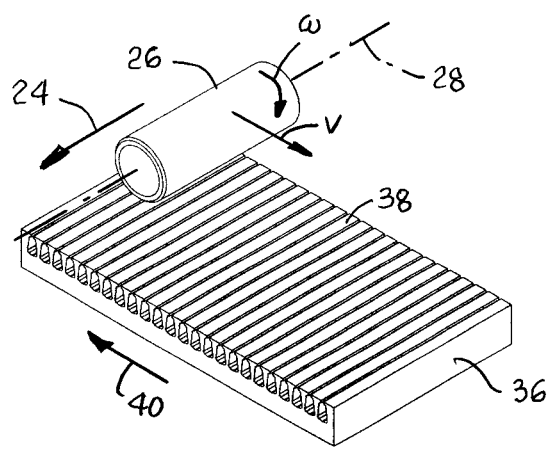
FIG. 2 is an enlarged isometric view showing a magnetic-field-generating stator and one of the belt rollers of FIG. 1.
Figure 3:
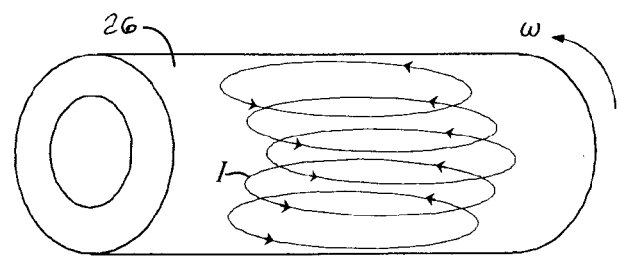
FIG. 3 is an enlarged view of the belt roller of FIG. 2 showing circulating currents induced in the belt roller.
Figure 4A:
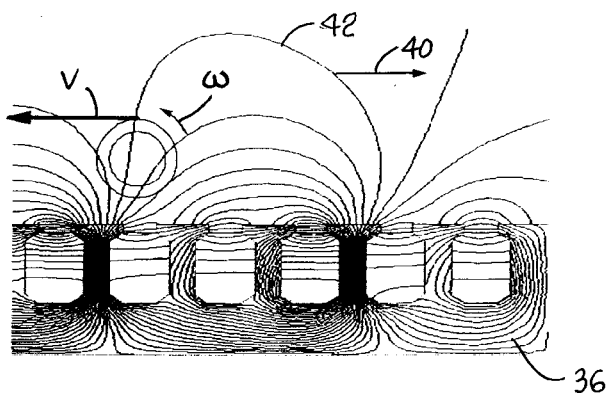
FIGS. 4A-4C are side views of the stator of FIG. 2 showing the magnetic flux pattern as the field moves from left to right in the figure.
Figure 4B:
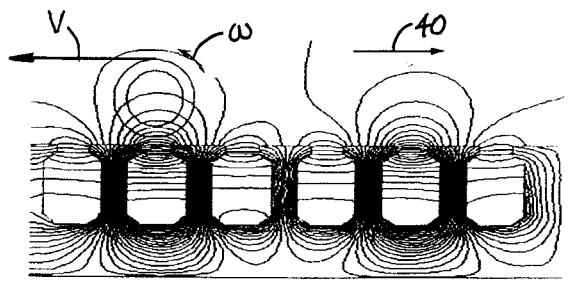
Figure 4C:
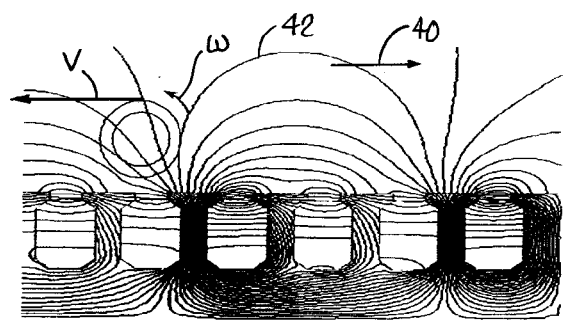

The rollers 26, as also shown in FIG. 2, are cylindrical and made of an electrically conductive material, such as aluminum or copper. The aluminum or copper could form the outer surface of the rollers, or the aluminum or copper could be covered by another material, such as a plastic or elastomeric material that would exhibit desirable properties for contact with conveyed articles. The roller 26 is depicted in FIG. 2 as a hollow conductive tube. Underlying the conveyor belt along a portion of the carryway is a magnetic-field source, such as the stator 36 of a linear induction motor. The stator has a series of poles 38 that are energized to produce a magnetic flux wave that travels along the length of the stator in a propagation direction 40 transverse to the direction of belt travel 24 in this example. As shown in FIGS. 3 and 4A-4C, the magnetic flux wave 42 traveling along the stator 36 induces a circulating current I in the electrically conductive roller 26 passing through the field. The current I produces a magnetic field that opposes the change in the flux of the magnetic field produced by the stator 36. The interaction of the stator field (the primary field) with the induced field (the secondary field) produces a force that rotates the roller at a rotational speed ω and a tangential velocity v at the top of the roller opposite to the propagation direction 40. In this way, the article 36 conveyed atop the rollers in FIG. 1 will be pushed off the side of the belt 22 in the transverse direction 44 when it reaches the magnetic-field-producing stators 36. If the propagation direction of the magnetic wave is reversed in the stator, the rollers 26 will rotate in the opposite direction and push the article 36 off the other side of the conveyor belt 22. The axes of rotation 28 of the belt rollers are perpendicular to the stator-wave propagation direction 40 and parallel to the direction of belt travel 24, which causes the rollers to push conveyed articles across the conveying surface 34 in the direction 44 perpendicular, or transverse, to the direction of belt travel. For this reason, the rollers 26 in the conveyor belt 22 of FIG. 1 are referred to as transverse rollers.

Figure 5:
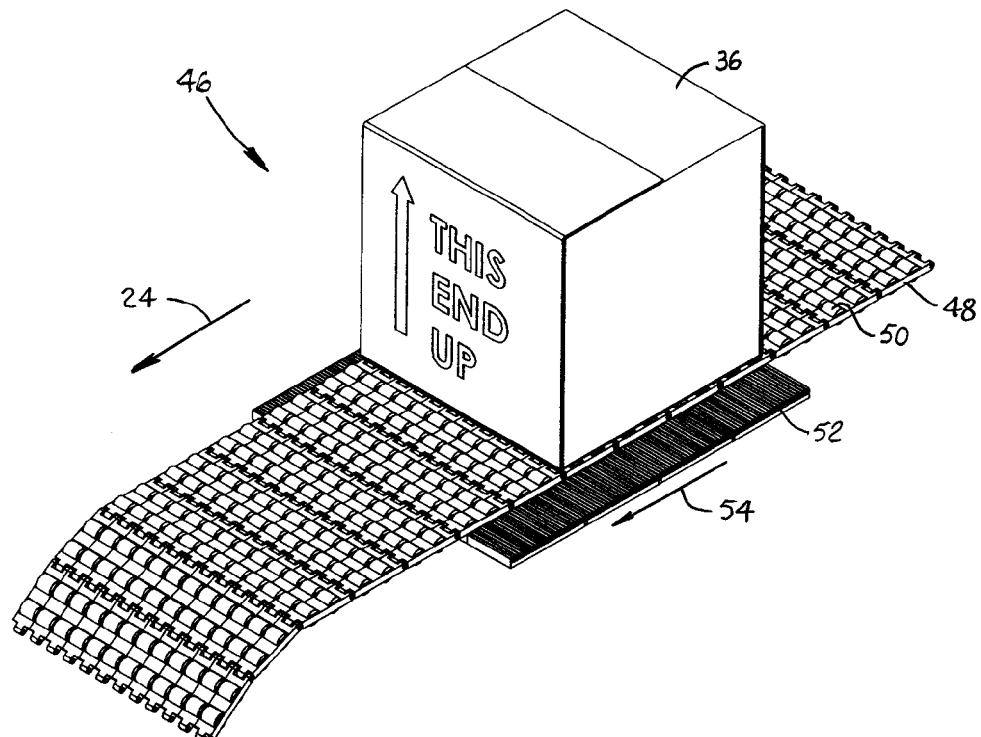
FIG. 5 is an isometric view of a portion of a conveyor as in FIG. 1, except with in-line, rather than transverse, belt rollers.

In the conveyor 46 shown in FIG. 5, a conveyor belt 48 has electrically conductive belt rollers 50 whose axes of rotation 52 are perpendicular to the direction of belt travel 24. These rollers are referred to as in-line rollers because they propel conveyed articles 36 in or opposite to the direction of belt travel 24. The stator 52 underlying the belt 48 on the carryway is rotated 90° from the stator 36 of FIG. 1 to produce a magnetic flux wave that has a propagation direction 54 in the direction of belt travel 24 to propel articles rearward on the conveying surface 34 of the belt. If the rearward tangential velocity of the rollers is equal to the forward speed of the belt, the conveyed article will remain stationary in space, which is useful in zero-back-pressure accumulation of backed-up articles. The belt speed and the propagation speed of the stator wave can be changed relative to each other to propel the articles rearward or forward. If the stator field is reversed, the belt rollers 50 rotate forward and accelerate articles at a speed faster than the belt speed to achieve article separation.

Figure 6:
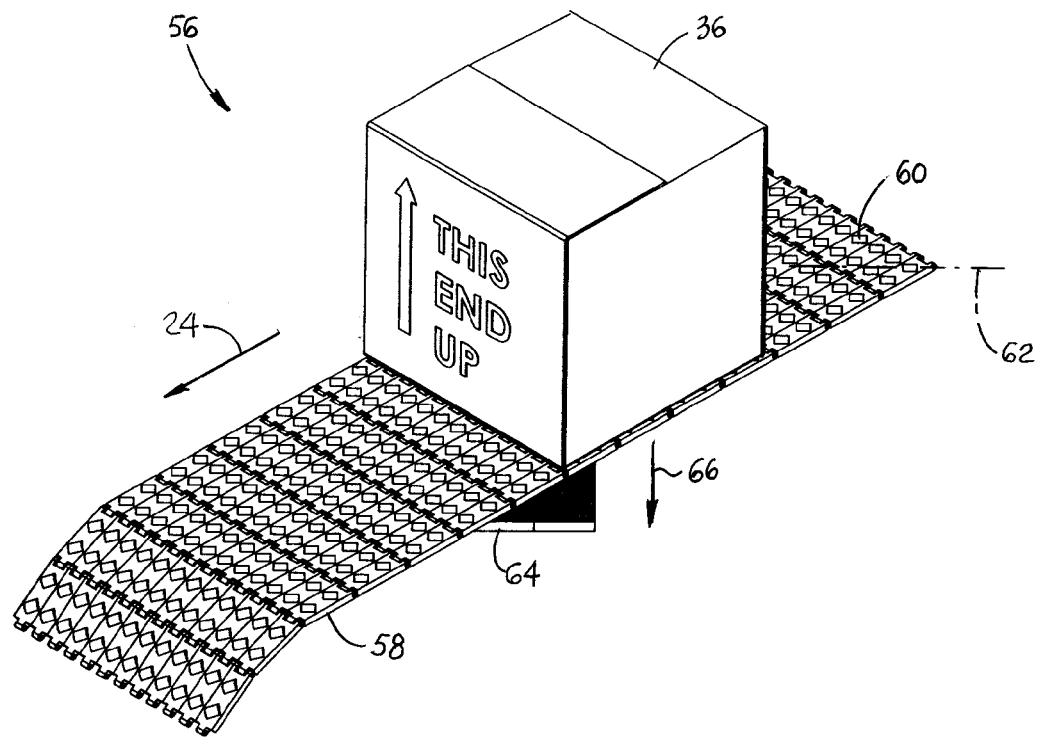
FIG. 6 is an isometric view of a portion of a conveyor as in FIG. 1, except with oblique belt rollers.

The conveyor 56 in FIG. 6 uses a conveyor belt 58 that has obliquely arranged conductive belt rollers 60 to divert conveyed articles 36 across the conveying surface of the belt along trajectories oblique to the direction of belt travel 24. The rollers 60 are freely rotatable on oblique axes 62. A magnetic-field-producing stator 64 creates a magnetic wave that travels along the linear stator in a stator-wave propagation direction 66 perpendicular to the axes of the oblique rollers 60. The forward-traveling stator wave causes the electrically conductive rollers to rotate opposite to the wave and push the articles obliquely rearward. If the stator field is reversed, the rollers reverse their rotation and push the articles 36 obliquely forward.

Although the conductive rollers in the conveyors of FIGS. 1, 5, and 6 are shown in endless conveyor belts, or mats, capable of advancing in a direction of belt travel, the rollers could also be embedded in or mounted on fixed, immobile mats. The mats could even be formed by a plurality of rollers or conveyor-belt sections long enough to extend over the stator. As another example, FIGS. 7A-7B show a turntable 70 topped with a stator 72 and a roller mat 74 having a plurality of freely-rotatable electrically conductive rollers 76. The roller mat 74 could be realized, for example, as a few rows of the in-line-roller conveyor belt 48 of FIG. 5. In FIG. 7A, the article 36 is fed or drawn onto the roller mat 74 in a first infeed direction 78. The in-line rollers 76 are inductively actuated by the stator 72 with a magnetic stator wave traveling opposite to the first direction 78. When the article 36 is centered on the turntable 70, the stator is de-energized. The turntable is then rotated 90° counterclockwise as shown in FIG. 7B until the article is positioned as in FIG. 7C. The stator 72 is then re-energized to produce a magnetic wave that travels in a propagation direction 80 to rotate the rollers in the opposite direction and push the article 36 off the turntable in an outfeed direction perpendicular to its infeed direction 78 as shown in FIG. 7D. Of course, the turntable can be rotated to any outfeed angle.

Figure 8:
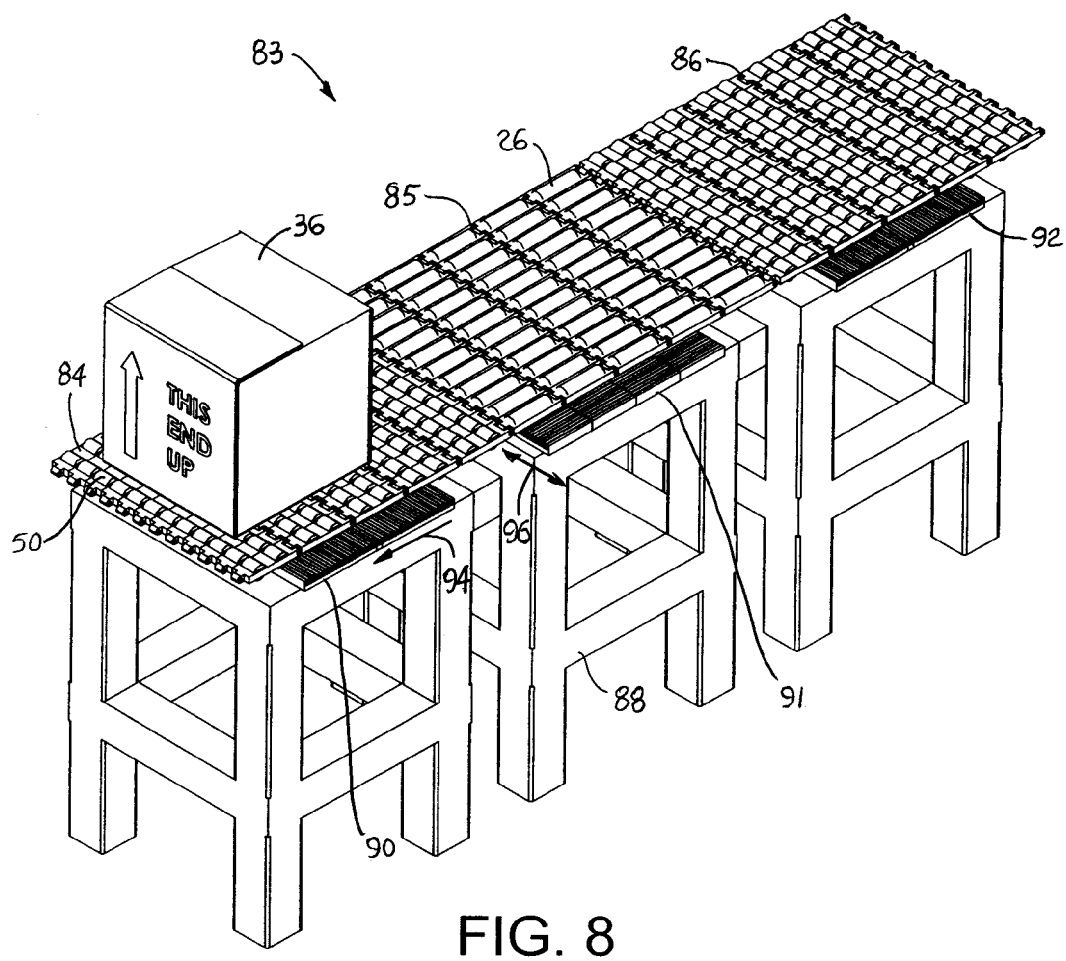
FIG. 8 is an isometric view of a conveyor having a series of fixed conductive rollers as in FIG. 1 configured as a sorter.

Another arrangement of a fixed mat of rollers is shown in a conveyor section 83 configured as a sorter in FIG. 8. Three roller mats 84, 85, 86 are arranged in series, linked together, and supported in a frame 88. Stators 90, 91, 92 underlie the mats. The first roller mat 84 has in-line rollers 50 used to draw an article 36 onto the conveyor. The first stator 90 propagates a magnetic wave in the first propagation direction 94 to rotate the rollers toward the second roller mat 85. The speed of the propagating wave determines the rotational speed of the electrically conductive in-line rollers 50. The roller speed can be set high enough to propel the article 36 all the way across the second roller mat 85. Or it can be set low enough so that the article stops on the second roller mat 85. If the article is not propelled past the second mat, the second stator 91 can be energized to produce a magnetic wave that travels in either transverse direction 96 to rotate the transverse electrically conductive rollers 26 in the opposite direction and direct the article 36 off a selected side of the conveyor. Articles 36 that are propelled past the second roller mat 85 onto the third roller mat 86 are directed off the end of the conveyor section 83. The third stator 92 generates a magnetic flux wave that travels in the same propagation direction 94 as the first stator 90 to propel the article 36 off the end. The fields produced by the first and third stators 90, 92 can be reversed, and articles can be fed onto the sorter and off its end in the opposite direction.

The stators shown underlying moving conveyor belts in FIGS. 1, 5, and 6 can be replaced by magnets, such as permanent magnets or electromagnets arranged with alternating polarities along the direction of belt travel. The static, but spatially varying, magnetic field produced by these time-invariant magnetic-field sources can rotate the rollers as long as the roller belt is advancing in the direction of belt travel. In that way, the rollers "see" a magnetic field that is changing as the belt advances in the direction of belt travel through the magnetic field. The spatial variation in the magnetic field encountered by the rollers as they advance with the belt induces a current in the electrically conductive rollers that causes them to rotate. Once the belt stops, however, no current is induced in the rollers, which will then coast to a stop. As shown in FIG. 9, the permanent magnets underlying the rollers 100 can be arranged in a Hallbach array 102, which increases the magnitude of the magnetic field above the array and decreases it below the array. The arrows on each magnet in the Hallbach array indicate the direction of the magnetic field along that face of the magnet. Because the rollers are advanced by the belt through a stronger magnetic field, the magnetic coupling and the roller torque are increased. Helical slots 104 in the periphery of the electrically conducted rollers 100 of FIG. 9 bias the rotation direction.

In the examples described thus far, stators and magnets served as sources, or primaries, of a magnetic circuit and electrically conductive rollers served as secondaries of the magnetic circuit. But the principle of operation could be reversed by making the roller a magnet (the primary) and underlying the conveyor belt with a conductive strip (the secondary) as shown in FIG. 10. The magnetic roller 106 acts as a source producing a magnetic field. Magnetic poles 108 are separated by helical slots 110 in the periphery of the roller. As the roller advances in the direction of belt travel 24, the twisted poles induce a current in an underlying electrically conductive element, such as a metallic strip or plate 112, that creates an induced magnetic field. The interaction of the primary magnetic field produced by the magnetic roller with the induced magnetic field in the electrically conductive element produces a force that causes the freely rotatable magnetic roller 106 to rotate.

Figure 11:
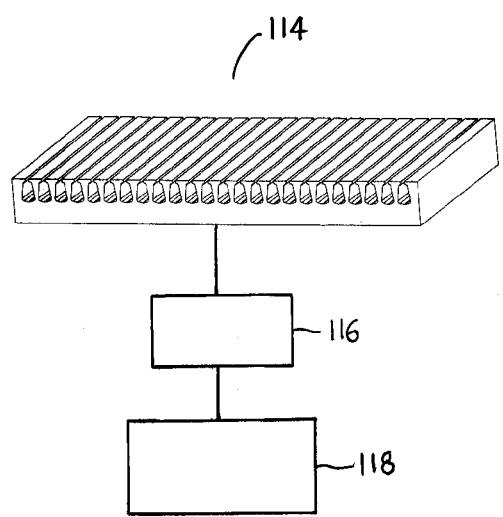
FIG. 11 is a block diagram of a stator drive usable with the stators of FIGS. 1, 2, and 4-8.

As shown in FIG. 11, the stators 114 are controlled by a motor drive system 116, such as a variable-frequency drive, that is coupled to a system controller 118 that can be used to coordinate stator frequency with belt speed and belt stopping and starting.

Although the invention has been described with the electrically conductive and magnetic belt rollers as article-supporting rollers, the rollers are not limited to use as rollers that contact articles directly. For example, the electrically conductive or magnetic belt rollers could be used to contact the carryway to help propel the conveyor belt, itself, along its path. Or the electrically conductive or magnetic belt rollers could be used to drive other rollers or non-roller components in the belt.

What is claimed is:

1. A conveyor comprising:
   a conveyor belt having a plurality of electrically conductive rollers having axes of rotation;
   a magnetic-field source generating a magnetic field passing through the conveyor belt and inducing a current in the electrically conductive rollers that causes the electrically conductive rollers to rotate.

2. A conveyor as in claim 1 wherein the conveyor belt advances in a direction of belt travel and wherein the magnetic-field source comprises a series of magnets of alternating polarity arranged along the direction of belt travel.

3. A conveyor as in claim 2 wherein the series of magnets forms a Hallbach array.

4. A conveyor as in claim 2 wherein the magnets are electromagnets.

5. A conveyor as in claim 2 wherein the magnets are permanent magnets.

6. A conveyor as in claim 1 wherein the magnetic-field source comprises a stator underlying the conveyor belt producing the magnetic field and forming a linear-induction machine with the electrically conductive rollers.

7. A conveyor as in claim 1 wherein the electrically conductive rollers comprise electrically conductive cylindrical tubes.

8. A conveyor comprising:
   a magnetic circuit having a magnetic-field source forming a primary side of the magnetic circuit and an electrically conductive element forming a secondary side of the magnetic circuit, wherein the magnetic-field source provides a primary magnetic field that induces a current in the electrically conductive element that provides a secondary field;
   a plurality of rollers forming a mat supporting conveyed articles;
   wherein each of the rollers is one of the magnetic-field source and the electrically conductive element and the other of the magnetic-field source and the electrically conductive element resides proximate the mat so that the primary and secondary magnetic fields coact to rotate the plurality of rollers.

9. A conveyor as in claim 8 wherein the mat is a conveyor belt advancing in a direction of belt travel.

10. A conveyor as in claim 8 wherein the mat is mounted atop a turntable.

11. A conveyor as in claim 8 comprising a plurality of mats arranged in series.

12. A conveyor as in claim 8 wherein the rollers are electrically conductive.

13. A conveyor as in claim 12 wherein the magnetic-field source comprises a stator underlying the mat and forming a linear-induction motor with each of the electrically conductive rollers.

14. A conveyor as in claim 12 wherein the magnetic-field source comprises an arrangement of magnets underlying the mat.

15. A conveyor as in claim 8 wherein the rollers are magnets.

16. A conveyor as in claim 15 wherein the mat is a conveyor belt advancing in a direction of belt travel and the electrically conductive element comprises an electrically conductive element underlying the conveyor belt.

17. A conveyor as in claim 8 wherein the magnetic-field source underlies the mat.

18. A conveyor belt advanceable in a direction of belt travel and comprising a plurality of modular body sections and a plurality of electrically conductive rollers supported in the body sections and serving as secondaries of magnetic circuits in which a primary magnetic field passing through the electrically conductive rollers as the conveyor belt advances induces currents in the electrically conductive rollers that produce secondary magnetic fields that interact with the primary magnetic field to produce forces acting on the electrically conductive rollers that cause the electrically conductive rollers to rotate.

19. A conveyor belt as in claim 18 wherein the electrically conductive rollers are article-supporting rollers.

20. A conveyor belt as in claim 18 wherein the electrically conductive rollers are in-line rollers.

21. A conveyor belt as in claim 18 wherein the electrically conductive rollers are transverse rollers.

22. A conveyor belt as in claim 18 wherein the electrically conductive rollers are oblique rollers.

23. A conveyor belt as in claim 18 further comprising:
   a series of belt modules hingedly interlinked end to end to form a conveyor belt, each module comprising a body section extending from a first end to a second end in the direction of belt travel;
   wherein the body section of at least some of the modules includes a conveying surface, at least one cavity formed in the body section and opening onto the conveying surface, and an electrically conductive roller rotatably disposed in the cavity to rotate.

24. A method for conveying articles, the method comprising:
   supporting articles atop electrically conductive rollers in a conveyor belt;
   subjecting the electrically conductive rollers to a magnetic field;
   inducing a current in the electrically conductive rollers with the magnetic field to rotate the electrically conductive rollers; and
   propelling articles along the conveyor belt with the rotating electrically conductive rollers.

25. The method of claim 24 further comprising advancing the conveyor belt through the magnetic field to rotate the electrically conductive rollers.

26. The method of claim 24 further comprising changing the magnetic field to induce the current in the electrically conductive rollers.

* * * * *